United States Patent

Slack et al.

[11] Patent Number: 5,756,636
[45] Date of Patent: May 26, 1998

[54] ISOCYANATE PREPOLYMERS PRODUCED FROM TOLUENE DIISOCYANATE RESIDUE DISSOLVED IN TOLUENE DIISOCYANATE

[75] Inventors: William E. Slack, Moundsville, W. Va.; Jyothi S. Pisipati, Wexford, Pa.

[73] Assignee: Bayer Corporation, Pittsburgh, Pa.

[21] Appl. No.: 774,278

[22] Filed: Dec. 27, 1996

[51] Int. Cl.$^6$ .......... C08G 18/10; C08G 18/76; C07C 269/02; C07C 271/26

[52] U.S. Cl. .......... 528/59; 521/49.5; 525/452; 525/457; 525/458; 528/67; 528/76; 528/77; 560/25; 560/26; 560/336; 560/360

[58] Field of Search .......... 528/59, 67, 76, 528/77; 560/25, 26, 336, 360; 521/49.5; 525/452, 457, 458

[56] References Cited

U.S. PATENT DOCUMENTS

| | | | |
|---|---|---|---|
| 4,143,008 | 3/1979 | Zwolinski et al. | 528/67 |
| 4,251,401 | 2/1981 | Reischl | 525/424 |
| 4,293,456 | 10/1981 | Reischl | 524/589 |
| 4,297,456 | 10/1981 | Reischl et al. | 525/452 |
| 4,311,800 | 1/1982 | Reischl | 521/109 |
| 4,489,177 | 12/1984 | O'Connor et al. | 528/67 |
| 4,507,464 | 3/1985 | Rasshofer | 528/288 |
| 4,996,242 | 2/1991 | Lin | 521/131 |
| 5,114,986 | 5/1992 | Lin | 521/131 |
| 5,143,945 | 9/1992 | Bodnar et al. | 521/130 |
| 5,216,042 | 6/1993 | Daussin et al. | 521/160 |
| 5,290,818 | 3/1994 | Nafziger et al. | 521/54 |
| 5,312,888 | 5/1994 | Nafziger et al. | 528/67 |

*Primary Examiner*—Rabon Sergent
*Attorney, Agent, or Firm*—Joseph C. Gil; Lyndanne M. Whalen

[57] ABSTRACT

A substantially solid free isocyanate prepolymer is made by reacting an isocyanate mixture which is made up of a toluene diisocyanate residue containing monomeric toluene diisocyanate and optionally, additional monomeric toluene diisocyanate in an amount such that the total NCO content is at least 37% with a polyether polyol having an ethylene oxide content of at least 30%. The polyether polyol has a molecular weight of from about 200 to about 6,000 and a functionality of from 2 to 6. The product prepolymers are particularly useful in the production of polyurethanes.

10 Claims, No Drawings

ISOCYANATE PREPOLYMERS PRODUCED FROM TOLUENE DIISOCYANATE RESIDUE DISSOLVED IN TOLUENE DIISOCYANATE

BACKGROUND OF THE INVENTION

The present invention relates to isocyanate prepolymers produced from toluene diisocyanate ("TDI") residue dissolved in TDI, to a process for the production of such prepolymers and to a process for the production of polyurethanes from these prepolymers.

TDI is generally produced by phosgenating toluene diamine ("TDA"). In the course of producing TDI by this process, a non-distillable by-product which is commonly referred to as "TDI residue" or "TDI bottoms" is generated. The amount of this by-product generated during phosgenation is dependent upon the amount of ortho-toluene diamine ("o-TDA") present in the amine starting material and the phosgenation conditions. Major concerns in the production of TDI are, therefore, the amount of TDI residue generated and whether such TDI residue is useful in other applications.

The usefulness of a TDI residue is largely dependent upon the heat history of that residue. That is, the longer the residue has been subjected to high heat to remove monomeric TDI, the more difficult it becomes to work with that by-product. It has generally been found that after the TDI monomer content of the TDI residue has been reduced to a level below 10%, the remaining residue is a solid at ambient temperature and is insoluble in the commonly used solvents. Consequently, TDI residues containing less than 10% monomeric TDI are not generally considered useful and are disposed of by incineration.

The desirability of using the large quantities of TDI residue generated during TDI production is evident from the prior art.

U.S. Pat. No. 4,293,456, for example, teaches that finely ground solid TDI residue which is substantially free of monomeric TDI (i.e., generally contains from 1 to 10% monomeric TDI) may be used as a reactive filler to produce polyurethane plastics. It is therefore possible to recycle the previously unusable TDI residue and to improve the mechanical properties of plastics made with that finely ground residue. The TDI residue used in this process may be water quenched and denatured or chemically modified by reaction with carbonyl compounds, compounds reactive to isocyanate groups, or carbodiimide groups. The TDI residue must, however, be size reduced to less than 3 mm before it can be used.

U.S. Pat. No. 4,297,456 also teaches that TDI residue which is substantially free of monomeric TDI (i.e., contains less than 7.5% monomeric TDI) and insoluble in organic solvents may be used in the production of molded articles and elastomers if that TDI residue is first comminuted to a mean particle size of less than 800 mµ. This TDI residue may be modified during or after grinding by reaction with water, an amine, ammonia, a compound containing hydroxyl groups or a compound containing carboxyl groups.

U.S. Pat. No. 4,507,464 teaches that a liquid isocyanate residue may be obtained by phosgenating a primary polyamine such as TDA in the presence of a compound selected from a specified group and having at least one primary or secondary alcoholic hydroxyl group. The amine and hydroxyl-group containing compound are used in quantities such that the equivalent ratio of primary amino groups to hydroxyl groups is from 1:0.005 to 1:0.99 during the phosgenation. The residue remaining after the desired isocyanate prepolymer has been removed is a liquid.

U.S. Pat. No. 5,290,818 discloses a process for producing rebond foam in which the binder includes TDI distillation bottoms having a monomeric TDI content of from 20 to 30%.

U.S. Pat. No. 5,312,888 also discloses a process for producing rebond foam in which TDI residue is blended with methylene diphenyl diisocyanate or polymethylene polyphenyl polyisocyanate and a hydroxyl compound to obtain a binder which is then applied to shredded foam. Toluene diisocyanate may optionally be included in the binder composition.

It would be advantageous to develop a method for using TDI distillation residue to produce a urethane group-containing prepolymer that is substantially free of solids.

SUMMARY OF THE INVENTION

It is an object of the present invention to provide a substantially solids free isocyanate prepolymer produced from TDI residue.

It is also an object of the present invention to provide a process for producing a substantially solids free isocyanate prepolymer from TDI residue.

It is another object of the present invention to provide polyurethanes which are produced from an isocyanate prepolymer formed from TDI residue.

It is a further object of the present invention to provide a process for producing polyurethanes, particularly polyurethane foams, from isocyanate prepolymers produced from TDI residue.

These and other objects which will be apparent to those skilled in the art are accomplished by selecting a TDI residue generated by phosgenation of TDA in which the o-TDA content was less than 0.5%. The TDI residue to be used in the present invention has a total NCO content (i.e., the total NCO content of monomeric TDI plus other isocyanate group containing materials) of at least 37%. TDI residues containing at least 10% by weight monomeric TDI and satisfying these criteria may be combined with additional toluene diisocyanate in an amount such that at least 1% and up to 40% by weight of the total amount of the isocyanate mixture is TDI residue and at least 60% by weight of the mixture is monomeric TDI. The TDI residue or isocyanate mixture containing TDI residue is reacted with a polyether polyol having ethylene oxide present therein in an amount of at least 30% by weight to form a urethane prepolymer having an isocyanate group content of from about 3 to about 40%. Polyurethanes may be produced from these prepolymers by reacting the prepolymer with an isocyanate-reactive compound in accordance with known methods.

DETAILED DESCRIPTION OF THE INVENTION

The present invention relates to isocyanate prepolymers produced from a TDI residue or a mixture of TDI and TDI residue and reacted with a polyether polyol having an ethylene oxide content of at least 30% and to the process for producing such prepolymers.

The TDI residues useful in the practice of the present invention must satisfy the following criteria: (1) the residue must have been generated by the phosgenation of toluene diamine in which the o-TDA content was less than 0.5%, preferably less than 0.1%, most preferably about 0; and (2) the total isocyanate group content of monomeric TDI plus any other isocyanate group containing material present must be at least 37%, preferably at least 39%.

With respect to the first of these criteria, the o-TDA content of the polyamine to be phosgenated may easily be determined by methods known to those skilled in the art such as gas chromatography. If the o-TDA content of the TDA is greater than 0.5%, the TDA may be treated (e.g., by fractional distillation) to reduce the level of o-TDA to an acceptable level. The phosgenation of TDA may be carried out by any of the methods known to those skilled in the art. Upon completion of that phosgenation, monomeric TDI is generally removed from the reaction mixture by distillation. In accordance with the present invention, the reaction mixture may be distilled until up to 90% of the monomeric TDI has been recovered. If more than 60% by weight of the monomeric TDI has been removed, TDI monomer is generally blended with the residue in an amount sufficient to bring the total TDI monomer content of the residue to at least 60% by weight. It is preferred, but not required, that any solvent employed in the phosgenation process be removed prior to use of the TDI residue in accordance with the present invention.

The TDI residue may be dissolved or otherwise combined with monomeric TDI in an amount such that at least 1% and up to 40% by weight, preferably from about 10 to about 38%, most preferably from about 30 to about 35% of the total isocyanate mixture is TDI residue. The TDI residue plus TDI must, however, be used in quantities such that at least 60%, preferably from 60 to 99% by weight, of the total mixture or solution is monomeric TDI.

It is, of course, possible to eliminate the need to dissolve TDI in a TDI residue by using TDI which had not been recovered separately but which was allowed to remain in the distillation vessel along with the TDI residue (e.g., by discontinuing distillation of the phosgenation product mixture prematurely).

The polyether polyol which is reacted with the TDI residue mixture or a TDI residue containing mixture must have an ethylene oxide content of at least 30% by weight, preferably from about 30 to about 40% by weight, most preferably from about 40 to about 60% by weight. Such polyether polyols may be produced in accordance with any of the methods known to those skilled in the art.

Polyether polyols useful in the practice of the present invention typically have functionalities of from about 2 to about 6, preferably from about 2 to about 4, and molecular weights (number average determined by end group analysis) of from about 200 to about 6,000, preferably from 1,000 to about 4,800. Examples of such polyether polyols include those obtained in known manner by reacting one or more starting compounds which contain reactive hydrogen atoms with alkylene oxides such as ethylene oxide, propylene oxide, butylene oxide, styrene oxide, tetrahydrofuran, epichlorohydrin or mixtures of these alkylene oxides. Polyethers obtained by addition of ethylene oxide alone or in combination with propylene oxide are most preferred. Suitable starting compounds containing reactive hydrogen atoms include polyhydric alcohols (described below as being suitable for preparing polyester polyols); water; methanol; ethanol; 1,2,6-hexane triol; 1,2,4-butane triol; trimethylol ethane; pentaerythritol; mannitol; sorbitol; methyl glycoside; sucrose; phenol; isononyl phenol; resorcinol; hydroquinone; and 1,1,1- or 1,1,2-tris(hydroxyl phenyl )-ethane.

Other polyols, particularly those having a functionality of from 2 to 6 and a molecular weight of from 200 to 6,000 (number average determined by end group analysis) known to be useful in the production of polyurethanes could also be included with the required polyether polyol. However, if such other polyols are used, those polyols must be used in an amount such that the ethylene oxide content of the total polyol mixture is at least 30%.

The TDI residue or TDI residue containing mixture is reacted with the polyether polyol containing at least 30% by weight ethylene oxide in a quantity such that the NCO content is from about 3 to about 40%, preferably from about 3 to about 30%, most preferably from about 9 to about 20%. This reaction may be carried out at temperatures of from about 20° to about 120° C., preferably from about 40° to about 90° C., most preferably from about 50° to about 70° C. The prepolymer formed as a result of this reaction is clear and substantially solids free (i.e., has a solids content of less than 0.5%).

The isocyanate prepolymers of the present invention may be used to produce polyurethanes in accordance with any of the known methods by reacting them with suitable isocyanate-reactive compounds, optionally in combination with additives and processing aids such as catalysts, surfactants, blowing agents, and crosslinking agents.

Suitable isocyanate-reactive compounds include polyether polyols, polyester polyols, polyamines, aminopolyethers, water and any combination thereof.

The polyether polyols which may be reacted with the prepolymers of the present invention include polyether polyols of the type used to produce these prepolymers, polyether polyols in which less than 30% by weight is ethylene oxide is present and polyether polyols in which no ethylene oxide is present. Such polyether polyols may be produced in the same manner as the polyether polyols used to produce the prepolymers of the present invention with the exception that ethylene oxide need not be used in the specified amounts and, in fact, need not be used at all.

Suitable polyether polyols will generally have a functionality of from about 2 to about 6, preferably from about 2 to about 4, most preferably from about 2 to about 3 and a molecular weight (number average determined by end group analysis) of from about 200 to about 6,000, preferably from about 1,000 to about 4,800, most preferably from about 2,000 to about 4,000.

Polyester polyols useful in the practice of the present invention typically have functionalities of about 2 and molecular weights (number average determined by end group analysis) of from about 400 to about 4,000, preferably from about 600 to about 2,000. Examples of such polyester polyols include the reaction products of polyhydric alcohols (preferably dihydric alcohols to which trihydric alcohols may be added) and polybasic (preferably dibasic) carboxylic acids. In addition to these polycarboxylic acids, corresponding carboxylic acid anhydrides or polycarboxylic acid esters of lower alcohols or mixtures thereof may also be used to prepare the polyester polyols useful in the practice of the present invention. The polycarboxylic acids may be aliphatic, cycloaliphatic, aromatic and/or heterocyclic and they may be substituted, e.g. by halogen atoms, and/or unsaturated. Examples of suitable polycarboxylic acids include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid an hyd ride, endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate. Suitable polyhydric alcohols include: ethylene glycol; 1,2- and 1,3-propylene glycol; 1,3- and 1,4-butylene glycol; 1,6-hexanediol; 1,8- octanediol; neopentyl glycol; cyclohexanedimethanol; (1,4-bis(hydroxymethyl) cyclohexane); 2-methyl-1,3-propanediol; 2,2,4-trimethyl -1,3-pentanediol; triethylene glycol; tetraethylene glycol; polyethylene glycol; dipropylene glycol; polypropylene glycol; dibutylene glycol and polybutylene glycol, glycerine and trimethylolpropane. The polyesters may also contain a portion of carboxyl end groups. Polyesters of lactones, e.g. caprolactone or hydroxyl carboxylic acids such as co-hydroxycaproic acid, may also be used.

Polyamines useful in the practice of the present invention will generally have a functionality of from about 2 to about 4, most preferably from about 2 to about 3 and a molecular weight (number average) of from about 400 to about 4,800, preferably from about 600 to about 4,000, most preferably from about 800 to about 2,000. Such polyamines may be produced by reductive amination of polyether polyols or by the cyanoethylation of polyols followed by hydrogenation. Polyoxypropylene diamines, triamines and mixtures thereof are preferred. Polymers containing both amino and hydroxyl groups obtained by the partial amination of a polyol are also useful in the practice of the present invention.

Aminopolyethers may also be used to produce urethanes from the prepolymers of the present invention. Suitable aminopolyethers generally have a functionality of from about 2 to about 4, preferably from about 2 to about 3 and a molecular weight (number average) of from about 400 to about 3,000, preferably from about 800 to about 2,000. Such aminopolyethers may be produced by any of the known methods. Such methods are described in greater detail in U.S. Pat. No. 5,510,535 which is incorporated herein by reference. Examples of specific aminopolyethers which are particularly useful in producing polyurethanes from the urethane prepolymers of the present invention include Jeffamine J 2000 which is commercially available from Texaco.

Short chain diols which may also be useful in the production of polyurethanes from the prepolymers of the present invention typically have molecular weights of from about 62 to about 400. Examples of suitable diols include: 1,3-butanediol, 1,2-propylene glycol, and ethylene glycol.

Monofunctional and even small amounts of trifunctional and higher functional compounds generally known in polyurethane chemistry may be used to produce polyurethanes in accordance with the present invention. For example, trimethylolpropane, glycerol and diethanol amine may be used where slight branching is desired.

Catalysts, solvents, surfactants, blowing agents, and other additives known to be useful in the production of polyurethanes may be used to aid the polyurethane-forming reaction. Examples of catalysts useful for promoting urethane reactions include di-n-butyl tin dichloride, di-n-butyl tin diacetate, di-n-butyl tin dilaurate, triethylenediamine, bismuth nitrate, N-methyl morpholine, diethyl ethanol amine, N,N-diethyl-3-diethylamino propyl amine, dimethyl benzyl amine, any of the known tertiary amine catalysts and organometallic catalysts.

Examples of useful additives include: colorants, cell openers, flame retardants, antioxidants, and mold release agents.

Examples of suitable surfactants include: siloxane/poly (alkylene oxide) copolymers such as those disclosed in U.S. Pat. Nos. 3,887,800 and 3,957,842 and any of the known fatty acid salts.

Examples of suitable blowing agents include: methylene chloride, acetone, pentane, hexane, methyl formate and carbon dioxide.

Foams may be prepared in accordance with the present invention by mixing the isocyanate prepolymer of the present invention with an isocyanate reactive material and any of the additives typically used by those skilled in the art and allowing the reaction to proceed to completion. Foams may also be prepared by a two-step process in which the isocyanate prepolymer of the present invention is first combined with an isocyanate-reactive material and then, while the reaction of the prepolymer and isocyanate-reactive material is proceeding, adding water, surfactant and catalyst to form a "pour-in-place" foam.

Having thus described our invention, the following Examples are given as being illustrative thereof. All parts and percentages given in these Examples are parts by weight and percentages by weight, unless otherwise indicated.

EXAMPLES

The materials used in the Examples which follow were:

Polyol A: a propylene glycol/propylene oxide/ethylene oxide adduct having 20% terminal ethylene oxide, a functionality of 2 and a molecular weight of 4000.

Polyol B: a propylene glycol/propylene oxide/ethylene oxide adduct having 30% terminal ethylene oxide, a functionality of 2 and a molecular weight of 4000.

Polyol C: a propylene glycol/propylene oxide/ethylene oxide adduct having 50% terminal ethylene oxide, a functionality of 2 and a molecular weight of 2000.

Isocyanate A: Toluene diisocyanate (80% 2,4-isomer and 20% 2,6-isomer) containing 35% by weight TDI Residue (generated from TDA having an ortho-isomer content of less than 0.5% by weight) and having a total NCO content of 39.0%.

Isocyanate B: Toluene diisocyanate (80% 2,4-isomer and 20% 2,6-isomer) containing 54% by weight TDI Residue (generated from TDA having an ortho-isomer content of less than 0.5% by weight) and having a total NCO content of 34.0%.

The procedure used in each of the Examples was as follows:

The indicated Isocyanate in the amount reported in the Table was heated to 60° C. and the indicated Polyol was added in the amount reported in the Table. The mixture was stirred at 60° C. for 2 hours and then cooled to 25° C. The appearance, NCO content and viscosity of each prepolymer is reported in the Table.

TABLE

| Example | 1 | 2 | 3* | 4* | 5* |
|---|---|---|---|---|---|
| Isocyanate | A | A | A | B | B |
|  | 107.2 | 107.2 | 103.8 | 118.7 | 101.1 |
| Polyol | B | C | A | A | B |
| grams | 257 | 219 | 248.8 | 235 | 200 |
| Appearance | Clear | Clear | Turbid with solids settling out | Turbid with solids settling out | Turbid with solids settling out |
| NCO content | 9.3% | 9.9% | 9.7% | 9.7% | 9.4% |
| Viscosity mPa.s (25° C.) | 4300 | 2704 | — | — | — |

*Comparative Example

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a substantially solids free isocyanate prepolymer having an isocyanate group content of from about 3 to about 40% comprising reacting a) an isocyanate mixture having a total isocyanate group content of at least 37% which is composed of
  1) a toluene diisocyanate residue containing at least 10% by weight monomeric TDI obtained by phosgenation of toluene diamine having an ortho-toluene diamine content of less than 0.5% and
  2) monomeric toluene diisocyanate in an amount such that a total of from 60 to 99% by weight monomeric toluene diisocyanate is present in the isocyanate mixture a), with
b) a polyether polyol having an ethylene oxide content of at least 30% by weight, a molecular weight of from about 200 to about 6,000 and a functionality of from about 2 to about 6 in amounts such that the total NCO content of the prepolymer reaction product is from about 3 to about 40%.

2. The process of claim 1 in which the polyether polyol has an ethylene oxide content of at least 30% by weight and any additional alkylene oxide groups are propylene oxide groups.

3. The process of claim 1 in which the polyether polyol has an ethylene oxide content of at least 50% by weight.

4. The process of claim 1 in which the TDI residue 1) is present in the isocyanate mixture a) in an amount of up to 35% by weight.

5. The process of claim 1 in which the isocyanate mixture a) has an isocyanate group content of at least 39%.

6. The process of claim 1 in which the toluene diisocyanate residue is produced by phosgenation of toluene diamine having an ortho-isomer content of less than 0.1%.

7. The isocyanate prepolymer produced by the process of claim 1.

8. The isocyanate prepolymer of claim 7 having an NCO content of from about 3 to about 30%.

9. The isocyanate prepolymer produced by the process of claim 2.

10. A process for the production of a polyurethane comprising reacting the isocyanate prepolymer of claim 7 with an isocyanate reactive compound.

* * * * *